Figure 1:
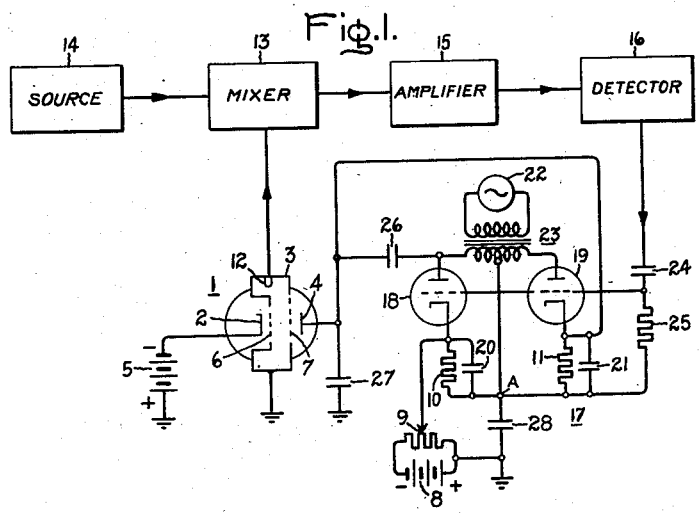

April 20, 1954      J. L. SCHULTZ      2,676,256
AUTOMATIC FREQUENCY CONTROL SYSTEM
Filed March 4, 1946      5 Sheets-Sheet 1

Inventor:
Jack L. Schultz,
by Norton D. Moore
His Attorney.

Inventor:
Jack L. Schultz,
by Merton D. Morse
His Attorney.

April 20, 1954  J. L. SCHULTZ  2,676,256
AUTOMATIC FREQUENCY CONTROL SYSTEM
Filed March 4, 1946  5 Sheets-Sheet 3
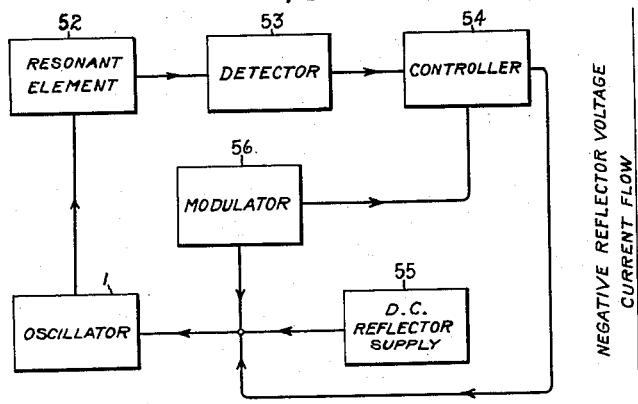
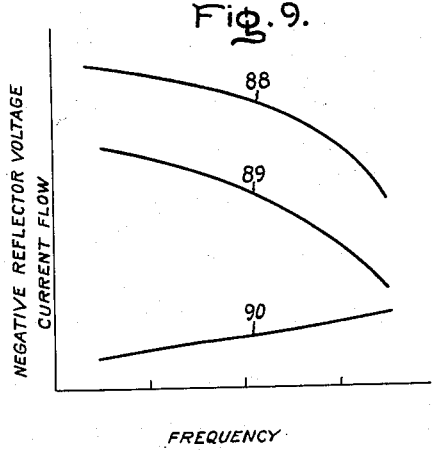
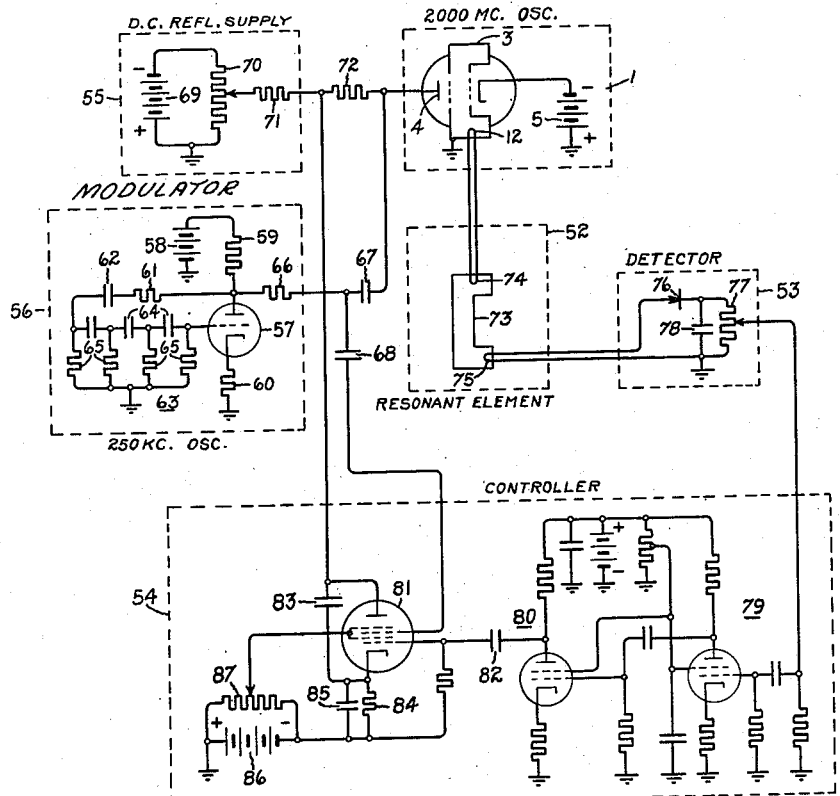
Inventor:
Jack L. Schultz,
by Merton D. Moore
His Attorney.

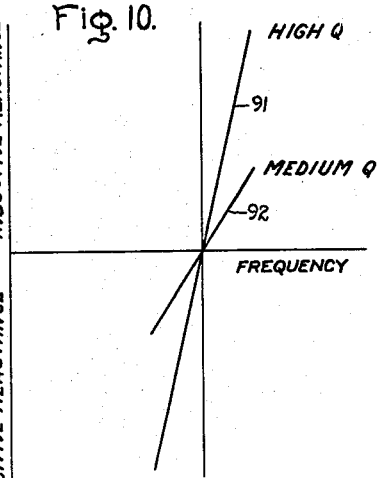
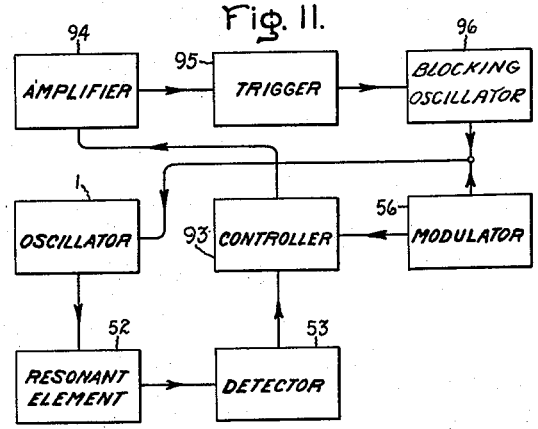
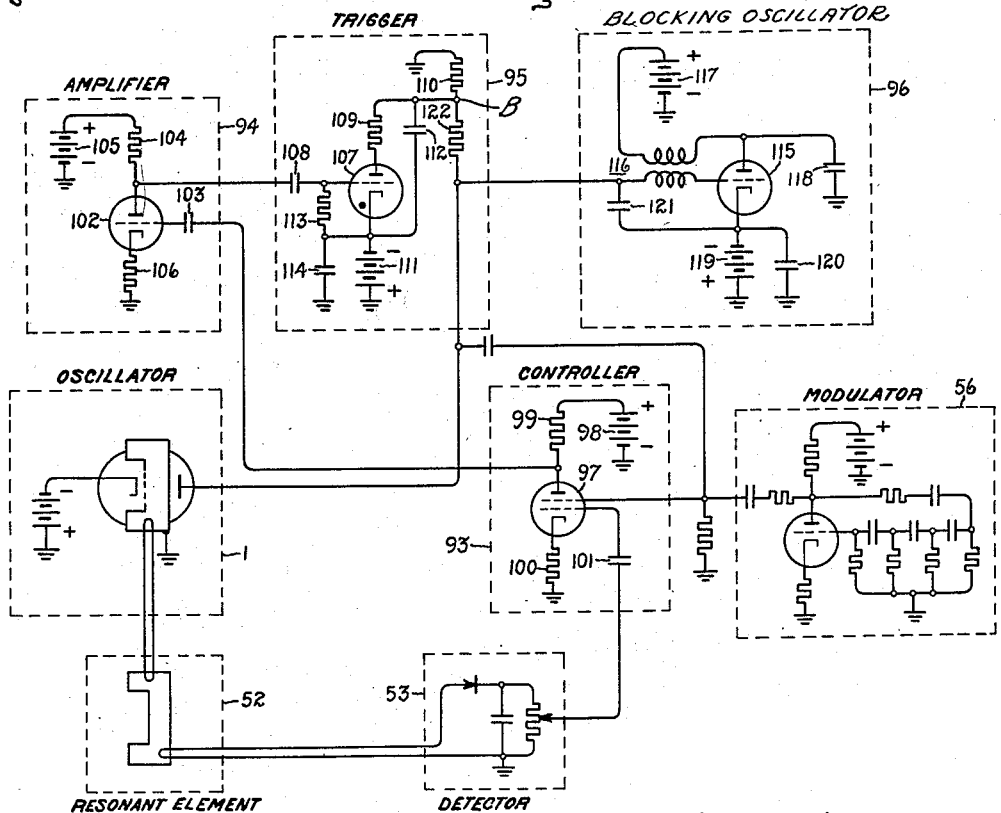

April 20, 1954  J. L. SCHULTZ  2,676,256
AUTOMATIC FREQUENCY CONTROL SYSTEM
Filed March 4, 1946   5 Sheets-Sheet 5
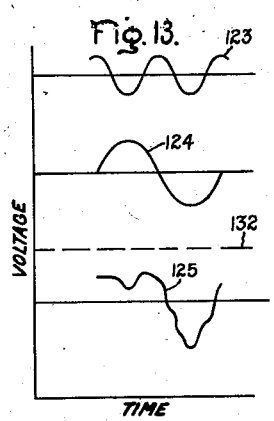
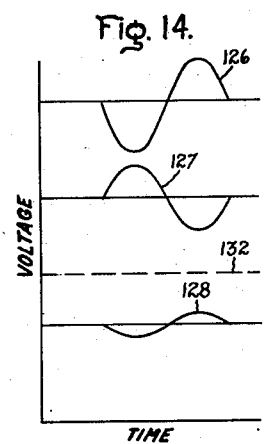
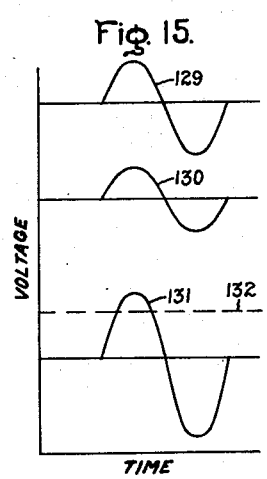
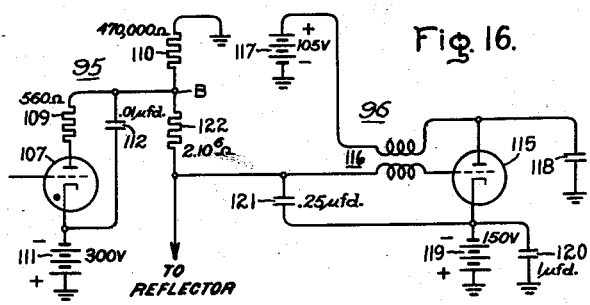
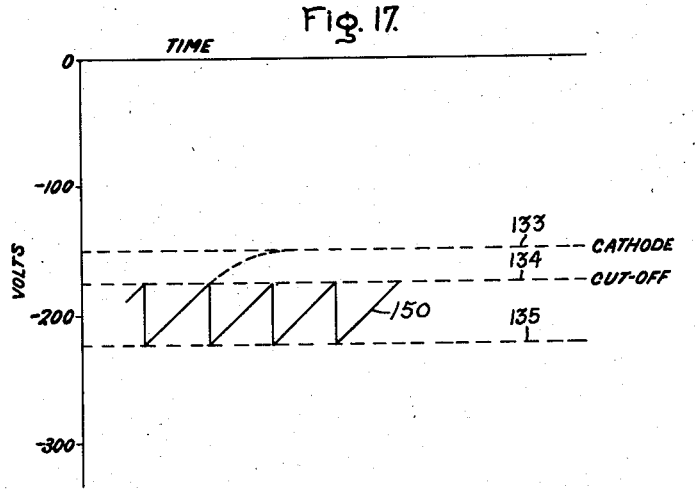
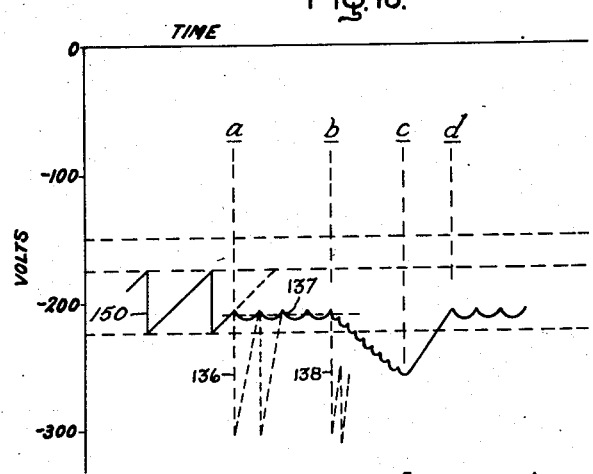
Inventor:
Jack L. Schultz,
by Merton D. Moore
His Attorney.

Patented Apr. 20, 1954

2,676,256

UNITED STATES PATENT OFFICE 2,676,256

AUTOMATIC FREQUENCY CONTROL SYSTEM

Jack L. Schultz, Syracuse, N. Y., assignor to General Electric Company, a corporation of New York Application March 4, 1946, Serial No. 651,944

1 Claim. (Cl. 250—27)

This invention relates to means for controlling the frequency of an oscillation generator and more particularly to means for maintaining this frequency at a predetermined value.

In radio systems it is often necessary to generate oscillations of a predetermined frequency or having a predetermined frequency relationship with a second source of oscillations or the natural resonant frequency of a resonant device. In superheterodyne receivers, for example, it is necessary that the local oscillator be controlled with respect to incoming signals in a manner to provide a frequency difference equal to the frequency of maximum output from the intermediate frequency amplifiers. This control is particularly necessary in the case of local oscillators for receivers used in pulse echo systems operating at microwave frequencies as in this apparatus the natural frequency drift of the transmitter and local oscillator is usually large with respect to the band width of the intermediate frequency amplifiers.

It is an object of this invention to provide improved means to control the operating frequency of an oscillator.

A further object of this invention is to provide improved means to control the operating frequency of an oscillator to maintain a predetermined relation to the frequency of an auxiliary source of oscillations.

Another object of this invention is to provide improved means to control the frequency of an oscillator to maintain a predetermined relation to the natural resonant frequency of a tuned transmission line, an LC circuit, a cavity resonator, or the like.

Another object of this invention is to provide frequency control means suitable for use in connection with a microwave oscillator.

Still another object of this invention is to control the frequency of an oscillator in an improved manner that is accurate and stable but at the same time does not require circuit components of critical value or balanced with respect to each other.

Yet another object of this invention is to control the frequency of an oscillator in an improved manner that does not interfere with the normal functioning of the oscillator as a source of oscillations.

The novel features which I believe to be characteristic of my invention are set forth with particularity in the appended claim. My invention itself, however, both as to its organization and method of operation, together with further objects and advantages thereof, may best be understood by reference to the following description taken in connection with the accompanying drawings in which Fig. 1 illustrates one embodiment of my invention as applied to a microwave oscillator, Figs. 2 to 6 show certain characteristics of the operation of this embodiment of my invention; Figs. 7 and 8 illustrate an alternative embodiment of my invention wherein the frequency of an oscillator is stabilized with respect to the resonant frequency of a resonant element, Figs. 9 and 10 show certain characteristics of the operation of this embodiment of my invention; Figs. 11 and 12 illustrate a further alternative embodiment of my invention wherein the frequency of an oscillator is stabilized with respect to the resonant frequency of a resonant element, and Figs. 13 to 18 show certain characteristics of the operation of this embodiment of my invention.

In Fig. 1 a microwave oscillator of the reflex type is shown generally at 1. This oscillator includes cathode 2, resonant cavity 3, and reflector electrode 4. The resonant cavity 3 comprises a resonant chamber having conducting walls in which are grids 6 and 7 positioned between the cathode 2 and anode 4. Voltage from unidirectional voltage source 5 connected between resonator 3 and cathode 2 causes electrons from cathode 2 to pass towards grids 6 and 7 located in the walls of cavity resonator 3 opposite cathode 2. Reflector electrode 4 is supplied with a voltage negative relative to resonator 3 from a source of unidirectional voltage 8 and potentiometer 9, through resistances 10 and 11. This voltage repels electrons from cathode 2 after they pass through grid 7, thereby reflecting a portion of them, particularly the electrons of lower velocity, in the opposite direction through grids 6 and 7. This action causes the oscillator 1 to set up a high frequency electric field within resonator 3, the frequency of this field being determined by the dimensions of resonator 3 and the voltage on reflector electrode 4. This field, in turn, modulates the velocity of the electrons passing from grid 6 to grid 7, causing these electrons to pass grid 7 with alternately higher and lower velocities, the lower velocity electrons being repelled by anode 4 to sustain the oscillations.

Pick-up loop 12 is provided extending through and insulated from the wall of resonator 3 to link the magnetic field within resonator 3 thereby to provide voltage of frequency corresponding to oscillator 1.

Oscillations from pick-up loop 12, together with signals from source 14, are applied to mixer 13, thus producing a beat note having frequency equal to the frequency difference between the oscillations supplied from these two sources. In a radio pulse echo system, source 14 may, for example, be the transmitter. This beating may be achieved by several methods well known in the art, one method consisting of simultaneously applying both signals to the input circuit of an electron discharge device or crystal detector. The signals from mixer 13 are applied to intermediate frequency amplifier 15 tuned to the desired beat frequency. They are then demodulated in detector 16. The detector output is then supplied to the frequency control system generally shown at 17.

It is the purpose of the frequency control system generally shown at 17 to alter the voltage at reflector electrode 4 of oscillator 1 in such manner as to cause the signals applied to amplifier 15 to be of frequency producing maximum output therefrom. This performance is achieved by causing the total voltage drop across resistances 10 and 11 to aid or oppose the voltage supplied from potentiometer 9 to reflector electrode 4, the increase or decrease always being in a direction to cause oscillator 1 to operate at a frequency differing from the input signal frequency by an amount providing maximum output from intermediate frequency amplifier 15 and detector 16.

The frequency control system 17 consists of electron discharge devices 18 and 19 having their cathodes connected to point A through resistances 10 and 11, these resistances being shunted by capacitors 20 and 21 respectively. Anode voltage is applied to these devices from alternating voltage source 22 connected to the primary winding of transformer 23, the anode voltage applied to each device being 180 degrees out of phase with the anode voltage applied to the other. Control electrode voltage is applied to devices 18 and 19 through capacitor 24 and resistance 25, the control electrode voltage applied to device 18 being the same as the control electrode voltage applied to device 19. This voltage is taken from detector 16 and is of value determined by the response characteristics of mixer 13, amplifier 15, and detector 16.

A small alternating voltage of the frequency of source 22 is applied to reflector electrode 4 of oscillator 1 from the voltage divider including capacitors 26, 27, and 28. These capacitors are connected in series across the left hand portion of the secondary winding of transformer 23. The value of this voltage is dependent on the relative sizes of these capacitors. Inasmuch as this capacity divider introduces no phase displacement, the voltage at electrode 4 is in phase with the anode voltage of device 18. This varying voltage causes the total reflector voltage at oscillator 1 to vary above and below the average value established by the voltage selected by potentiometer 9 and the voltage drops across resistances 10 and 11. Hence, the frequency of oscillator 1 varies at the frequency of source 22, the magnitude of the variation depending on the value of alternating voltage applied to electrode 4 and the characteristics of oscillator 1.

The unidirectional voltage applied to reflector electrode 4 consists of two components. One component is the portion of voltage from unidirectional voltage source 8 selected by potentiometer 9, this voltage establishing the negative D.-C. potential at the cathode of device 18. If no voltage drop exists across resistances 10 and 11, this voltage equals the negative reflector voltage. The second component of reflector voltage is that due to the combined voltage drop across resistances 10 and 11. This voltage depends on the current flow through these resistances and is developed in a manner described in further detail hereinafter. Briefly, however, when the frequency of oscillations of oscillator 1 differs from the frequency of oscillations from source 14 by the frequency of maximum response of intermediate frequency amplifier 15, the voltage drops in resistances 10 and 11 are equal and opposite, thereby producing no net voltage at reflector electrode 4. On the other hand if the frequency of oscillator 1 is above or below this optimum value, the voltage drops in resistances 10 and 11 are not equal and a net voltage difference tending to cause oscillator 1 to return to the desired frequency is developed.

Figure 2:
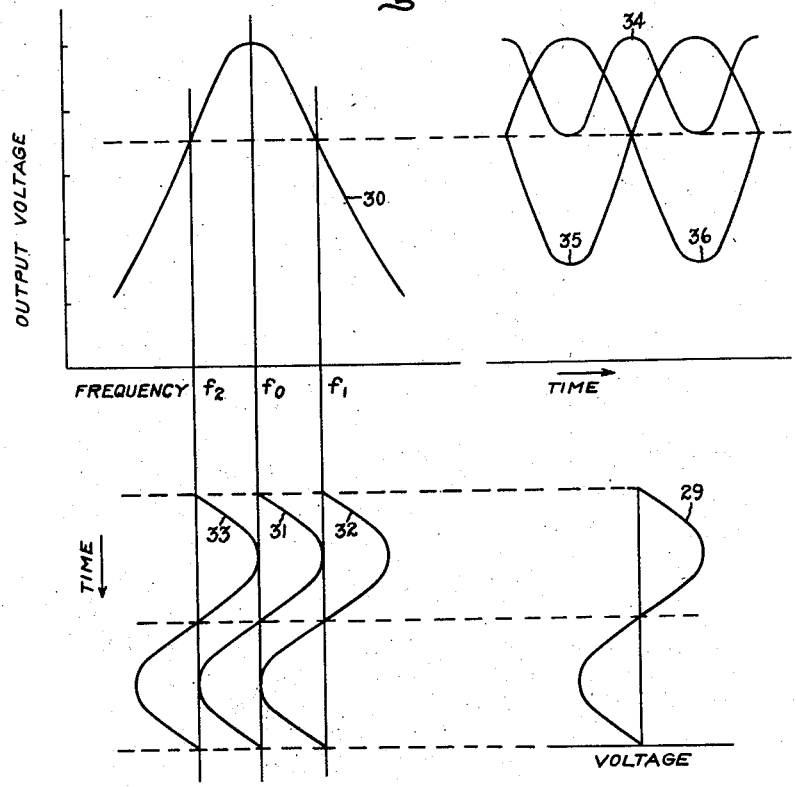

The operation of frequency control system 17 may be understood best by reference to Figs. 2, 3, 4, 5, and 6. In Fig. 2, curve 30 represents the output voltage characteristic of mixer 13 and intermediate frequency amplifier 15, this output voltage being plotted against input frequency. This curve is a conventional amplifier selectivity curve, having maximum value at frequency $f_0$ and reduced value at frequencies other than $f_0$. It will be understood, of course, that while the frequency scale of Fig. 2 represents the frequency of oscillator 1, the actual frequency of output voltage from mixer 13 is the difference frequency between this value and oscillations from source 14. As shown on the curve, the output voltage change is very nearly symmetrical from small frequency deviations from $f_0$. The alternating voltage applied to the reflector electrode 4 (Fig. 1) from source 22 is shown at curve 29, Fig. 2. This voltage causes the frequency of oscillator 1 to vary above and below the average frequency established by unidirectional voltage from source 8. For the condition wherein the unidirectional voltage component at reflector electrode 4 causes oscillator 1 to operate at a frequency differing from the frequency of signals at source 14 by frequency $f_0$, the actual operating frequency varies in accordance with curve 31, Fig. 2. In Fig. 2, the time scale of curve 31 corresponds with the time scale of curve 29. The resulting output voltage from amplifier 15 is shown in curve 34, the voltage scale in this curve corresponding with the voltage scale of curve 30 and the abscissa being time. From this curve it is evident that the output voltage of amplifier 15 varies at twice the frequency of the variations in curve 31 and has maximum amplitude at the instant of zero time on the curves.

If the unidirectional voltage applied to reflector electrode 4 from source 8 is such as to cause oscillator 1 to operate at a frequency of $f_1$, the frequency of oscillator 1 varies as shown in curve 32. The corresponding output voltage variation from amplifier 15 is shown in curve 35. Similarly if the unidirectional reflector voltage causes oscillator 1 to operate about frequency $f_2$ as shown in curve 33, the output voltage from amplifier 15 varies in accordance with curve 36. It is evident that curves 35 and 36 are similar except that a 180 degree phase relationship exists between their fundamental frequency components.

Figure 3:
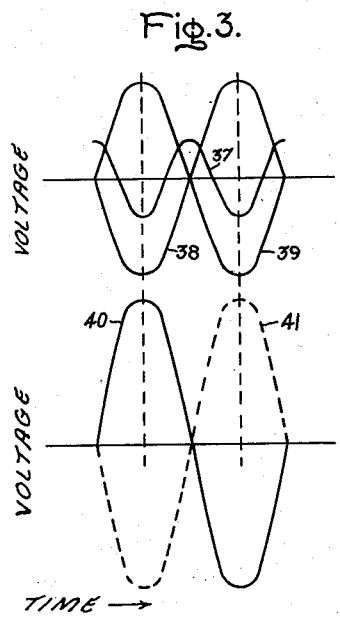

Detector 16 produces output voltage varying in accordance with the amplitude of the envelope of output voltage from amplifier 15. Due to the presence of condenser 24, only the alternating components of this output voltage are applied to the control electrode of devices 18 and 19. The resulting control electrode voltages are shown in Fig. 3, curves 37, 38, and 39, these curves corresponding with curves 34, 35, and 36 of Fig. 2 respectively. The voltage from source 22 applied to device 18 is shown in curve 40, this curve corresponding to curve 29, Fig. 2. The voltage applied to the anode of device 19 is shown in curve 41 and has a 180 degree phase displacement with respect to curve 40. It will thus be observed that at frequency $f_1$ a voltage is supplied to both grids of devices 18 and 19 which has the same frequency and phase as the anode voltage of device 18; while at frequency $f_2$ the grid voltage has the same fundamental frequency but is reversed in phase, being now in phase with the anode voltage of device 19.

The values of resistances 10 and 11, the voltage of source 22, and the capacity of condensers 20 and 21 are so chosen that devices 18 and 19 completely charge these condensers during each cycle of source 22. That is, the current flow through device 18, for instance, is sufficiently large to charge condenser 20 to its full value before the voltage of source 22 becomes substantially less than the peak value. Hence, capacitors 20 and 21 are charged successively to the full voltage required for cut-off of space current flow in devices 18 and 19 due to the presence of these condensers between the grid and cathode of the respective discharge tubes. If the control electrode voltage to one of these devices is negative at the instant of charging, the required voltage across the corresponding condenser will be small or even zero inasmuch as the control electrode voltage produces part of the necessary bias. On the other hand, if the control electrode is positive at the instant of charging, greater voltage across the corresponding condenser is required to achieve cut-off bias between the cathode and grid inasmuch as this voltage must compensate for the voltage applied to the control electrode.

Figure 4:
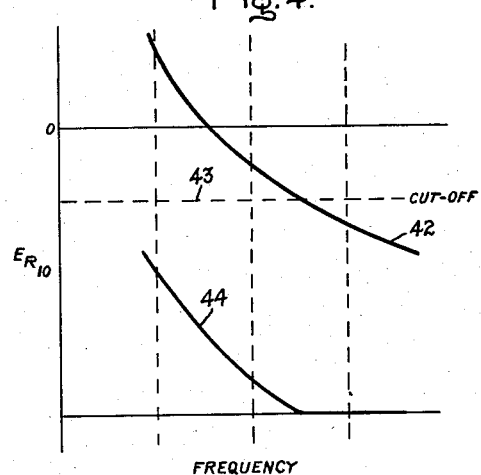

The operation of device 18 may be understood more readily by reference to Fig. 4. In this figure, curve 42 shows the value of control electrode voltage applied to this device at the peak positive value of curve 40, Fig. 3, as a function of frequency, this value corresponding to the instant at which device 18 develops cut-off bias. Dashed line 43 shows the cut-off bias required between the cathode and control electrode of device 18. The voltage difference between curve 42 and line 43 corresponds to the voltage reached by capacitor 20 and is plotted in curve 44. This voltage is zero when curve 42 goes below line 43 for the reason that no current flow can take place under this condition. It is evident that as frequency is increased, this voltage decreases. Inasmuch as the voltage across resistance 10 is equal in value to that across capacitor 20, curve 44 also represents the voltage across that resistance. The time constant of the RC combination of capacitor 20 and resistance 10 is made sufficiently long to cause substantially constant voltage across resistance 10 between successive cycles of source 22, thereby providing a substantially uniform voltage across that resistance which varies only in accordance with changes in operating frequency of oscillator 1.

Figure 5:
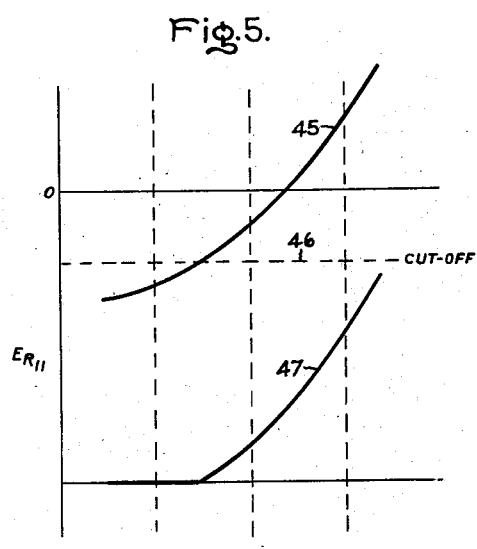

Fig. 5 shows curves similar to those of Fig. 4 but corresponding to the operation of device 19. In this case, the effective grid voltages operating on the device are those at the instant of maximum positive voltage of curve 41, Fig. 3, and are plotted in curve 45. The cut-off voltage is shown in dashed line 46 and the resulting voltage across capacitor 21 and resistance 11 shown in curve 47. It is evident that the voltage across resistance 11 increases with increasing frequency, a tendency opposite to that of the voltage drop across resistance 10.

Figure 6:
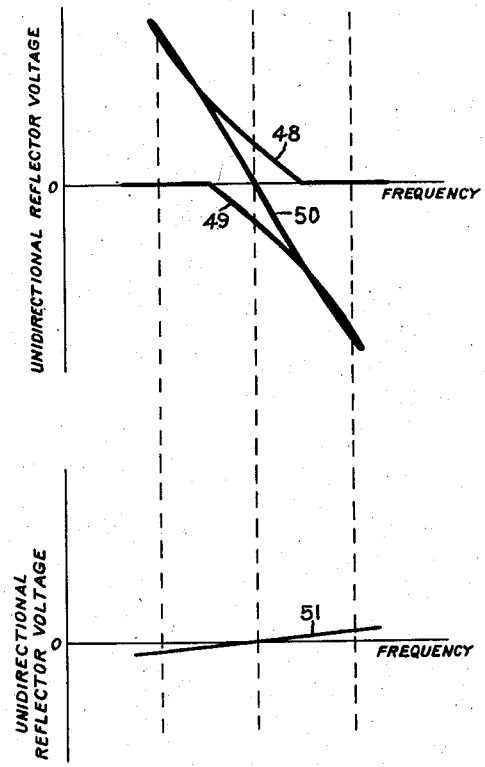

As far as the reflector electrode of oscillator 1 is concerned, the total effective voltage due to resistances 10 and 11 is the difference voltage between the voltage drop across resistance 10 and the voltage drop across resistance 11. This results from the fact that as the circuit between source 8 and reflector electrode 4 is traversed, resistance 10 has a voltage of the same direction as source 8 whereas resistance 11 has a voltage of opposite direction. The combination of these voltages from the standpoint of reflector electrode 4 is shown in Fig. 6. In this figure, curve 48 corresponds to curve 44 of Fig. 4 and curve 49 corresponds to the inverse of curve 47, Fig. 5. The latter curve is inverted so that the voltages of curves 48 and 49 may be directly added to show the total voltage contributed by resistances 10 and 11 to the voltage of reflector electrode 4. This combined voltage is shown in curve 50. It is evident from this curve that the effective negative voltage at reflector electrode 4 is greatly decreased as the frequency increases and that the voltage change tends to be symmetrical with respect to frequency.

Curve 51, Fig. 6, shows the relationship between the operating frequency of oscillator 1 and the voltage applied to reflector electrode 4. In this case a relatively small voltage change is required to produce the frequency changes shown on the curve. It should be observed that the zero voltage values shown in Fig. 6 correspond with the unidirectional voltage from source 8 required to operate oscillator 1 at frequency $f_0$ and that the voltage actually shown corresponds only to variations from this value.

The performance of my invention in effect corresponds to that of a feedback system with respect to frequency. That is, any effect causing the frequency of oscillator 1 to deviate results in a change in reflector voltage corresponding to many times the actual frequency deviation. This reduces the frequency deviation to a negligible value and causes the system to operate at a frequency corresponding very nearly that of maximum output from amplifier 15.

While I have described the operation of frequency control system 17 for the case of a balanced system wherein all components in the circuit of devices 18 and 19 are of equal value, it will be evident to those skilled in the art that such components need not be used to obtain satisfactory performance of the system. In fact complete elimination of device 18 or device 19 will not necessarily prevent satisfactory system operation. The principal effect of having an unbalance as between these circuits is to alter slightly the frequency of oscillator 1 and the frequency range over which the control is operative rather than to cause any change in the control for deviations in this frequency.

One of the advantages of this invention is that oscillator 1 is caused to operate at a predetermined frequency above or below the frequency of oscillations from source 14, the oscillator operating at a frequency above the frequency of oscillations from source 14 for the case of the connection shown in Fig. 1 and the oscillator operating below the frequency of oscillations from source 14 for the case wherein condenser 26 is connected to the anode of device 19. This results from the fact that with oscillator 1 below the frequency of signals from source 14 increased reflector voltage decreases the difference or intermediate frequency and with oscillator 1 above the frequency of signals from source 14 decreased reflector voltage decreases the difference or intermediate frequency.

Hence, it is not only possible to cause oscillator 1 to operate at the desired frequency difference with respect to source 14, but it is also certain whether the oscillator frequency is above or below that of source 14. If undesired signals may be introduced at source 14 this aids in preventing false control with respect to such frequency. If the system is used to generate a desired frequency for calibrating purposes, this feature prevents an ambiguity in the frequency obtained.

While mixer 13, intermediate frequency amplifier 15, detector 16 and system 17 have been shown as separate units in the drawing of Fig. 1, the various functions of these units may be combined to reduce the total number of units required. For instance, mixer 13 may have a frequency response characteristic similar to that of curve 30, Fig. 2, and provide output voltage of such magnitude that amplifier 15 may be eliminated. Similarly, devices 18 and 19 may be made to operate as detectors as well as control devices, thereby eliminating detector 16.

In an alternate embodiment of this invention, source 14 may be an antenna sensitive to radiant energy of a particular frequency range. In this case system 17 will cause oscillator 1 to operate at a frequency giving maximum output from intermediate frequency amplifier 15 in the same manner as above described but in addition the signals from amplifier 15 or detector 16 may be used to operate a converting system to reproduce the intelligence contained therein. The system then acts both as a receiver and as a frequency control device.

The magnitude of frequency modulation of oscillator 1 introduced by alternating voltage from source 22 determines to some degree the performance of this invention. If, for instance this frequency modulation is completely lacking, no control is achieved. On the other hand, if the frequency modulation is excessive in amplitude, oscillator 1 would have limited usefulness by reason of these large variations. In addition, the control achieved by system 17 would be limited as the slope of curve 30, Fig. 2, becomes small for large frequency deviations from the frequency of maximum output. In general, the frequency modulation of oscillator 1 should be sufficient to cause the deviation to correspond approximately with the half-power points on the output curve of detector 16. That is with unidirectional voltage from source 8 of such magnitude as to cause oscillator 1 to operate on the frequency giving maximum output from detector 16, the output on the maximum frequency deviation associated with the alternating component of reflector voltage should be around 70 per cent of the maximum value.

In the application of this invention to a radio type pulse-echo system, signals from source 14 can conveniently originate in the transmitter of the system. An additional coupling loop is then provided in resonator 3 to couple oscillations of oscillator 1 to the mixer stage of the receiver, the equipment shown in Fig. 1 having no relation to the receiver except as a means of obtaining local oscillator voltage of optimum frequency. Inasmuch as signals at source 14 originate in the transmitter, these signals consist of recurrent high energy pulses and are not continuous as is assumed in the above description of the operation of the system.

Inasmuch as the time constants of resistance 10 and capacitor 20 and resistance 11 and capacitor 21 are very long with respect to the pulse interval, the control voltage applied to reflector electrode 4 is unaffected by the pulses and frequency stabilization is obtained as described. If, in addition, it is desired to render the pulse echo system relatively immune to interfering signals that might appear in source 14, the voltage of source 22 may be pulsed in accordance with the transmitter signals, thereby rendering the frequency stabilizing system inoperative unless the transmitter is operating.

In applying this invention to a radio type pulse-echo system wherein a rotating structure is used in the antenna system it is desirable that the frequency of source 22 exceed the frequency of rotation of that structure. The usual effect of rotating the antenna structure is to alter periodically the load on the transmitter, thereby causing a certain amount of frequency pulling. This results in frequency modulation of the transmitter at the frequency of rotation. To avoid effects of this frequency modulation it is desirable to apply a voltage from source 22 which has a sufficiently high frequency to cause the frequency of oscillator 1 to follow these periodic frequency disturbances and thereby maintain maximum output from the receiver at all times. This fast circuit operation can be obtained without causing the voltages across resistances 10 and 11 to vary between cycles of source 22 because the time interval between these cycles is correspondingly lowered.

An alternate embodiment of this invention will now be described with reference to Figs. 7, 8, 9, 10, and 11. The principal differences between this embodiment and that previously described resides in the use of a resonant element as a frequency determining device and modifications in the control system to maintain oscillator frequency at a desired value with respect to the natural oscillating frequency of the resonant element.

In the block diagram of Fig. 7, 1 represents the oscillator desired to be controlled as to operating frequency and 52 represents a resonant element having natural resonant frequency of value corresponding to the desired frequency of oscillator 1. Part of the output voltage of oscillator 1 is fed to element 52, thereby causing alternating currents, voltages, electric fields, and magnetic fields in element 52 of intensity corresponding to the relative value of the actual frequency of operation of oscillator 1 and the natural frequency of resonant element 52. Hence, resonant element 52 causes energy flow in accordance with frequency, maximum energy flow taking place at resonant frequency and less energy flow at other frequencies. Detector 53 is connected to element 52 in such manner as to produce a unidirectional output voltage varying in accordance with the envelope of variations in one of the above-listed characteristics of element 52. Oscillator 1 is of a type wherein the frequency of oscillation depends on an applied voltage, this voltage being primarily derived from source 55, Fig. 7. In addition, an alternating modulating voltage is applied to oscillator 1 from modulator 56 and a unidirectional correction voltage applied from controller 54. Controller 54 is fed with voltage from modulator 56 and detector 53 and provides output voltage corresponding to the relationship between these two voltages, this voltage being applied to oscillator 1 in a manner to cause that unit to operate at a mean frequency corresponding to the natural resonant frequency of circuit 52.

The operation of this form of my invention will now be described with respect to Fig. 8 which shows a more detailed circuit diagram of the system as it may be used to control the frequency of a microwave oscillator which may, for example, be operating at 2000 megacycles per second. In Fig. 8, oscillator 1 is of the reflex type using a cavity resonator and is similar in construction to that described in detail with reference to Fig. 1. As explained with reference to Fig. 1, the frequency of operation of oscillator 1 depends not only on the dimensions of the cavity resonator and the tube electrodes but also on the voltage applied to reflector electrode 4.

Frequency modulation of oscillator 1 is provided by voltage from modulator 56. This unit may consist of any one of many oscillators and is shown for purposes of illustration as a phase shift or resistance-capacitance type oscillator. It consists of electron discharge device 57 having its anode connected to ground through positive voltage source 58 and resistance 59 and its cathode connected to ground through resistance 60. The control electrode of device 57 receives voltage from the anode through resistance 61, capacitor 62 and the RC delay network shown generally at 63. The latter network consists of a plurality of condensers 64 and resistances 65 arranged to provide a more than 180 degree phase shift between the anode and control electrode potentials of device 57 at the desired frequency of oscillation. In a microwave radar system, this frequency might be 250 kilocycles per second. Modulator 56, therefore, acts as a phase shift oscillator at this frequency and produces sine wave alternating voltage of 250 kilocycles per second. This voltage, taken through resistance 66, and capacitor 67, is applied to the reflector electrode 4 of oscillator 1 to cause the frequency of that oscillator to vary about the value established by the unidirectional potential at that electrode. In addition, output voltage from oscillator 5 is applied to controller 54, through capacitor 68.

A substantially constant unidirectional voltage component is applied to reflector electrode 4 of oscillator 1 by D. C. reflector supply source 55. This source may, for example, comprise a battery 69 connected to a potentiometer 70, the latter having a moving contact across which any desired voltage may be obtained. Voltage from the moving contact of potentiometer 70 is taken through resistances 71 and 72 to the reflector electrode 4 of oscillator 1. Source 55 therefore provides an adjustable unidirectional voltage of substantially constant magnitude at the reflector electrode of oscillator 1.

The resonant element 52 in a microwave system may comprise a resonant cavity such as that shown generally at 73, Fig. 8. Energy is coupled into this cavity from oscillator 1 by loops 12 and 74. Energy is coupled out of this cavity by coupling loop 75 and applied to detector 53. This detector may comprise crystal 76, resistance 77, and capacitor 78, the voltage across resistance 77 being determined by the value of the voltage induced in loop 75. It will be understood, of course, that units 52 and 53 may be combined to form a single unit, crystal 76 being placed at a point in cavity 73 wherein an electrostatic field is developed and capacitor 78 and resistance 77 connected directly across the crystal.

In an alternate construction of resonant element 52, a transmission line may lead from oscillator 1 to detector 53 and element 52 connected to the line in such manner as to absorb energy except when oscillations correspond to the natural frequency of the element.

Controller 54, includes amplifiers 79 and 80 and electron discharge device 81. These amplifiers are of conventional design and amplify the alternating components of voltage across resistance 77. Inasmuch as the voltage in loop 75 depends on the frequency of oscillator 1, the voltage at resistance 77 varies in magnitude in accordance with the frequency modulation produced by modulator 56.

Signals from amplifier 80 are applied to the control electrode of device 81 through coupling capacitor 82. Voltage from modulator 56 is applied to an auxiliary control electrode of the same device through coupling capacitor 68 which is sufficiently large to pass this voltage without significant phase shift. Capacitor 83 is connected between the anode and cathode of device 81 and is chosen to have capacity sufficient to provide a relatively long time constant as compared to the period of oscillations from modulator 56. Resistance 84 and capacitor 85 provide grid bias for device 81 in the conventional manner. Unidirectional bias voltage is applied to the screen grid of device 81 by battery 86 and potentiometer 87, the battery having polarity such as to cause the screen to be positive with respect to the cathode. In addition, battery 86 applies sufficient negative voltage to the cathode of device 81 to cause this electrode to be negative with respect to the anode by an amount providing optimum operation of that device.

In operation, voltages applied to the control and injector grids of device 81 combine to cause current flow therethrough in accordance with the instantaneous values of the combined voltage at the two grids. Condenser 83 smooths this current flow to cause the voltage drop across resistance 71 to be substantially constant as compared with the period of modulator 56. Hence, the unidirectional voltage applied to reflector electrode 4 of oscillator 1 is varied in accordance with the relationship of the modulating voltage from modulator 56 and the envelope of induced voltage in loop 75, thereby causing the mean frequency about which oscillator 1 is frequency modulated to vary in accordance with this value. Of course the voltage in loop 75 is dependent on the relation between the frequency of oscillator 1 and the resonant frequency of the structure 73 as was described in connection with the curves of Fig. 2 and Fig. 1.

In the circuit of controller 54, the voltage of battery 86, the positive terminal of which is grounded, is chosen sufficient to cause the anode of device 81 to be positive with respect to the cathode despite the negative voltage applied by source 55. If, for example, it is desired to operate device 81 with 300 volts between the cathode and anode at zero space current and the voltage from source 55 is 300 volts, source 86 is designed to develop 600 volts. Inasmuch as current flow through device 81 is from the anode to the cathode, increasing values of this current flow cause the negative voltage at the reflector electrode 4 of oscillator 1 to increase. Hence, as the value of combined voltage from detector 53 and oscillator 56 increases, the negative voltage at the reflected electrode 4 of oscillator 1 is increased and the frequency of operation of oscillator 1 accordingly raised.

Operation of the embodiment of this invention shown in Figs. 7 and 8 can best be understood with reference to Figs. 2, 3, and 9. The voltage across resistance 77, Fig. 8, varies with oscillator frequency in accordance with curve 30, Fig. 2. That is, at a particular value of frequency of oscillator 1 the output voltage is a maximum and for small deviations from this frequency less output voltage is produced. Similarly, the voltage from modulator 56 varies in accordance with curve 29, Fig. 2, and the resulting frequency of oscillator 1 in accordance with curves 31, 32, and 33 when the direct component of reflector voltage at oscillator 1 causes operation about frequencies $f_0$, $f_1$, and $f_2$, respectively. Hence, the voltage applied to amplifier 79 for these three values of the unidirectional component of reflector voltage consists of the alternating components of curves 34, 35, and 36, Fig. 2. These voltages are shown in curves 37, 38, and 39, Fig. 3, and the corresponding voltage from modulator 56 in curve 40, Fig. 3. It is evident therefore, that the voltage applied to the control electrode of device 81 varies in accordance with curves 37, 38, and 39 as the value of mean frequency of oscillator 1 is changed and that the voltage of the auxiliary control electrode of device 81 varies in accordance with curve 40 regardless of the mean frequency of oscillator 1.

In one method of operating device 81, Fig. 8, the value of auxiliary electrode voltage from modulator 56 is chosen to have a very great effect on space current in device 81 as compared to the voltage applied to the control electrode by amplifier 80. In this case, device 81 will be biased to cut-off by the charge on condenser 85 except at the instant of maximum voltage from modulator 56. The anode current flow on the positive peaks of that voltage then varies in accordance with the voltage applied to the control electrode at that instant, a value that may be obtained from curves 37, 38, and 39, Fig. 3. The resulting peak current flow then varies in accordance with curve 88, Fig. 9, the value of current decreasing with increased frequency of oscillator 1. Since this current flow tends to make the anode of device 81 more negative with respect to the cathode, the voltage at reflector 4 varies as shown in curve 89, Fig. 9. Inasmuch as the capacity of condenser 83 is chosen to provide a long time constant as compared with the period of oscillations from modulator 56, the voltage shown in curve 89 is substantially constant with time and appears as a substantially constant voltage at the reflector electrode 4 of oscillator 1. Curve 90, Fig. 9, shows the variation in operating frequency of oscillator 1 as the negative reflector electrode voltage is increased. It is evident that the reflector voltage change introduced by the action of the regulating system (curve 89, Fig. 9) is much greater than the reflector voltage change required to produce that frequency change. Hence the system operates to maintain constant the frequency of oscillator 1.

In an alternate method of operating device 81, Fig. 8, the values of auxiliary control electrode voltage from modulator 56 and control electrode voltage from amplifier 80 are chosen to maintain device 81 in a conducting condition during a substantial portion of the cycle of voltage from modulator 56. In this case, the current flow through device 81 will vary in accordance with the combined values of these two voltages. By reference to Fig. 3, it is evident that with oscillator 1 operating at mean frequency $f_2$ (oscillator 1 operating below the desired frequency) these two voltages are in phase and accordingly combine to produce relatively large current flow through the entire positive portion of the cycle. With oscillator 1 operating about mean frequency $f_0$, curve 37, Fig. 3, is negative over part of the positive half cycle of curve 40 and reaches no large positive voltage during other portions of this half cycle. Hence, the current flow in device 81 is of lower average value than for the case of frequency $f_2$. Similarly curve 38 (corresponding to frequency $f_1$) is negative throughout the entire positive half cycle of curve 40 and produces still lower average current flow. Inasmuch as condenser 83 causes the current flow through resistance 71 to be a substantially constant value varying in accordance with the average current flow through device 81, the voltage drop across that resistance is substantially constant with time and increases with frequency to produce a negative reflector voltage change similar to that shown in curve 89, Fig. 9. Viewed differently, the voltage across condenser 83 can be regarded as determined by the integral of the combined voltage from amplifier 80 and modulator 56, thereby controlling the negative reflector as shown in curve 89, Fig. 9. Since the variation in operating frequency of oscillator 1 with changing values of reflector voltage follows curve 90, Fig. 9, it is evident that the regulating system causes the operating frequency of oscillator 1 to be stabilized.

In the modification of my invention shown in Figs. 7 and 8, the resonant element 52 is coupled to oscillator 1. Inasmuch as this resonant element has reactance at frequencies other than the resonant frequency ($f_0$), this coupling tends to influence the operation of oscillator 1. If the variation in this reactance is very great with respect to the operating frequency of oscillator 1, the frequency of this oscillator will tend to be unstable, and control will accordingly be difficult to achieve. This effect may be avoided by the use of a resonant element having medium efficiency or "Q." That is, the ratio of stored energy to the losses per cycle should be chosen at a medium rather than a high value. In this case, the variation in reactance of element 52 as seen by oscillator 1 will not be great as the frequency of oscillator 1 varies. Fig. 10 shows graphically this effect, curve 91 showing the large reactance variation of a high Q resonant element at frequencies close to resonant frequency and curve 92 showing the reactance variation of a lower efficiency resonant circuit over the same frequency range. Medium Q performance may be obtained in a resonant circuit employing lumped inductances and capacitances by introducing resistance into the circuit. In a cavity resonator, plating the inside surfaces with a low conductivity metal will achieve this result.

It is further desirable in the automatic frequency control system of Fig. 7 to adjust the coupling of resonant element 52 to oscillator 1 in a manner that provides a reasonable value of insertion loss. If the couplings are increased beyond a certain point, thereby decreasing the insertion loss, the influence of the cavity on oscillator performance becomes excessive and stable performance becomes very difficult to achieve.

The frequency control achieved by the above described modification of this invention is dependent mainly on the stability of resonant element 2 which serves to establish reference frequency. In many applications, such as the frequency control of microwave oscillators, this feature is of considerable importance for it permits the use of a resonant structure as a frequency establishing device. Such a structure may, for example, consist of a resonant cavity constructed of some readily machined metal and so designed that the various parts move in response to temperature changes in such manner as to compensate for the effect of these changes on resonant frequency. Devices of this type are well known in the art and have been manufactured in quantity production. Thus the frequency of the oscillator is stabilized in a simple and efficient manner without the use of expensive and complicated equipment.

A further embodiment of this invention is shown in Fig. 11. This embodiment is similar to that shown in Figs. 7 and 8 in that a resonant element is used as a source of reference frequency but differs therefrom in the method of causing the frequency of oscillator 1 to correspond with the natural resonant frequency of the resonant element. The block diagram of Fig. 11 differs from Fig. 7 in that controller 93 is connected to amplifier 94 which in turn operates trigger circuit 95. The latter a blocking oscillator modifies the operation of device 96 in such manner as to cause the voltage applied to oscillator 1 to vary in a manner (presently to be described) so as to maintain constant the frequency of oscillator 1.

Having outlined the basic elements of this modification of my invention, the detailed features thereof will now be described with reference to Fig. 12 which shows detailed circuit diagrams of the various components shown in Fig. 11 disposed in operative relationship. Oscillator 1, resonant element 52, detector 53 and modulator 56, are shown as identical in construction to the corresponding components shown in Fig. 8 although equivalent devices might, of course, be used.

Controller 93 includes electron discharge device 97 having its anode connected to ground through positive voltage source 98 and resistance 99 and its cathode connected to ground through resistance 100. Two control electrodes are provided in device 97, one being connected through condenser 101 to detector 53 and the other being connected to modulator 56. Inasmuch as the space current through device 97 varies in accordance with the combined potential of the two control electrodes, the voltage drop across resistance 99 varies with both of these voltages. The alternating component of this voltage is applied to amplifier 94, which includes electron discharge device 102 having its control electrode connected to controller 93 through capacitor 103. The anode of device 102 is connected to ground through resistance 104 and positive voltage source 105 whereas the cathode is connected to ground through resistance 106. Inasmuch as increased positive voltage at the control electrode of device 102 causes increased space current to flow therethrough, the voltage drop across resistance 104 increases with increased positive potential at that electrode. Hence, the positive potential of the anode of device 104 decreases with increased positive voltage from controller 93.

The output of amplifier 94 is applied to trigger circuit 95 which includes gas discharge device 107. The control electrode of device 107 is connected to the anode of device 102 through coupling capacitor 108. The anode of device 107 is connected through resistances 109 and 110 to ground whereas the cathode is connected through source of negative potential 111 to ground. Grid leak resistance 113 is connected between the cathode and control electrode of device 107 and by-pass capacitor 114 is connected across source 111, thereby to cause the control electrode of device 107 to vary above and below the potential of the cathode as determined by the alternating voltage across resistance 104. Condenser 112 is connected across device 107 and resistance 109, thereby to be charged to the full potential of source 111 when device 107 is not conducting and when there is no voltage drop across resistance 110. The time constant of this charge is determined by resistance 110. When the combined voltages applied to the control electrodes of device 97 in controller 93 exceed a predetermined value, voltage is applied to the control electrode of device 107 in sufficient amount to cause that device to conduct, thereby discharging condenser 112. Following this discharge, condenser 112 is charged at the time constant determined by resistance 110 and device 107 is restored to the initial operating condition.

Blocking oscillator 96 comprises an electron discharge device 115, the anode of which is connected through one winding of transformer 116 and positive voltage source 117 to ground. The high frequency components of alternating voltage at the anode of device 115 are shunted to ground by condenser 118. The cathode of device 115 is connected to ground through negative voltage source 119 bypassed by condenser 120. Condenser 121 connects the cathode of device 115 through the other winding of transformer 116 to the control electrode of that device. In operation, when current flow commences to build up in device 115, transformer 116 causes the resistance-condenser combination comprising capacitor 121 and resistances 110 and 122 to develop bias far beyond cut-off of device 115. Condenser 121 then discharges through resistances 122 and 110 until the bias becomes less than cut-off at which time a current pulse again flows in device 115 and the cycle is repeated. Condenser 120 prevents the generation of high frequency voltage across source 119 during this process. The resultant voltage across capacitor 121 is of sawtooth shape, having a rising portion determined by the time constant of capacitor 121 and resistances 116 and 122, and repeating at a frequency determined by this time constant.

The method of varying the peak voltage applied from trigger 95 in accordance with the frequency of oscillator 1 may be understood by reference to the curves of Figs. 2, 13, 14 and 15. As explained in connection with the modification of this invention shown in Fig. 7, curve 34, Fig. 2, represents the output voltage of detector 53 when operation is about frequency $f_0$. The output of detector 53 which corresponds to the envelope of these oscillations, is applied through condenser 101 to one control electrode of device 97, this voltage being shown in curve 123, Fig. 13. The corresponding voltage applied from modulator 56 to the other control electrode of device 97 is shown in curve 124, Fig. 13. The total effective voltage causing anode current in device 97 and hence establishing the voltage at the control electrode of device 107 varies in accordance with the sum of these voltages, this curve being substantially as shown in curve 125. Under these conditions, the voltage 125 is a distorted wave, as shown, because the two component waves have different fundamental frequencies. In Fig. 14, the conditions when oscillator 1 is operating about frequency $f_1$ are shown, curve 126 being the alternating component of curve 35, Fig. 2, and curve 127 being the voltage from modulator 56. The combination of these two voltages is substantially as shown in curve 128, Fig. 14. Under these particular conditions, it will be observed that all waves have the same fundamental frequency and the resultant wave 128 is of low amplitude and of opposite phase to the voltage wave 127 from modulator 56. In like fashion, Fig. 15 shows the conditions at device 97 for operation about frequency $f_2$, Fig. 2, curve 129 being the voltage applied to one control electrode of device 97, voltage 130 being the voltage applied to the other control electrode and voltage 131 representing the combined effects of these voltages insofar as current flow through device 97 is concerned.

Line 132 is drawn in Figs. 13, 14, and 15 at a voltage value corresponding to that required to cause device 107, of trigger 95 to commence conduction. This line is on the positive side of the curves of Figs. 13, 14, and 15 because of the phase inverting action of amplifier 94. From the figures, it is evident that device 107 is caused to conduct only under the conditions shown in Fig. 15; i. e., when oscillator 1 is operating about frequency $f_2$ so that the resultant wave 131 has the same fundamental frequency and phase as wave 130 from modulator 56, and also has sufficient amplitude for the positive peaks to exceed the bias 132 on the grid of device 107.

While only three operating frequencies have been considered in the above description it will be evident that the peak effective voltage operating on trigger device 107 varies in accordance with the mean frequency of oscillator 1, this voltage increasing as the frequency of oscillator 1 decreases. Inasmuch as conduction of device 107 causes the negative unidirectional voltage at the reflector electrode 4 to increase in a manner to be described in detail hereafter, any tendency for the frequency of oscillator 1 to decrease is counteracted by an increased potential at reflector electrode 4. This increased potential tends to increase the frequency of oscillator 1 and thereby to maintain constant the frequency of oscillator 1.

The operation of trigger 95 and blocking oscillator 96 in controlling the unidirectional voltage applied to oscillator 1 will now be described. For purposes of this description, reference is first made to Fig. 16 which shows typical circuit values for the principal portions of these units. When device 107 is not conducting, no current flow takes place through resistance 110 due to this device and it therefore has no influence on the operation of the blocking oscillator comprising device 115. The potential at the common connection of resistance 122 and condenser 121, and hence the potential of reflector electrode 4 of oscillator 1, then varies in accordance with sawtooth curve 150 of Fig. 17. In this figure, the negative cathode potential at device 115 due to battery 119 is shown by dashed line 133 and the cut-off potential of the control electrode of device 115 by dashed line 134, this potential being negative with respect to potential 133 by the cut-off bias of device 115. In normal operation, current flow through device 115 will build up until cut-off bias is reached at which time the bias will suddenly become negative in an amount far exceeding the cut-off voltage. This negative voltage is shown at line 135, Fig. 17. From this negative voltage, capacitor 121 discharges towards the cathode potential as established by source 119, the time constant of this discharge being principally determined by the relative capacitance of capacitor 121 and the resistance of resistors 110 and 122. In a practical application of this invention, it is desirable to use a total value of resistances 110 and 122 of approximately 2.5 megohms and a value for capacitor 121 of approximately 0.25 microfarad, giving a time constant of the order of ½ second. When condenser 121 discharges to the cut-off voltage of device 115, conduction again commences and the condenser is again charged to the voltage of line 135. Hence, in the absence of conduction through device 107, the voltage applied to the reflector electrode of oscillator 1 comprises a sawtooth wave shown in Fig. 17.

Fig. 18 shows the effect of conduction in device 107 on the voltage applied to oscillator 1. Until time $a$, Fig. 18, the reflector voltage is shown for the case of device 107 in the non-conducting condition and consists of a portion of the curve 150 of Fig. 17. At time $a$, device 107 is suddenly rendered conducting by a positive voltage pulse applied to its control electrode, this action taking place by reason of the frequency of oscillator 1 reaching too high a value. At this instant, condenser 112 is suddenly discharged and point B (the common point of resistances 110 and 122) is reduced to substantially the potential at the negative terminal of source 111. In a practical system, this voltage might be 300 volts. Condenser 112 then charges through resistance 110 at a relatively rapid rate in comparison with the time constant of capacitor 121 and resistances 110 and 122, thus producing a voltage variation at point B (Fig. 16) as shown in dashed curve 136, Fig. 18. The voltage across condenser 121 does not follow this voltage exactly by reason of the time constant of that condenser and resistance 122. Hence, the curve 137, Fig. 18, makes a dip or scallop which returns the voltage across condenser 121 to its previous value in a time corresponding to the charging time of condenser 112. If at this instant device 107 is again made conducting, another scallop is executed immediately. As this successively happens, the unidirectional voltage applied to reflector electrode 4 varies as shown between time $a$ and time $b$, Fig. 18. As the voltage variations of curve 137 are of small magnitude as compared to the average voltage value, a substantially constant unidirectional voltage is supplied from device 96 to oscillator 1 under this condition. If, for instance, the frequency of oscillator 1 increases to the point wherein device 107 in trigger 95 is rendered conducting at each cycle of modulator 56, the voltage across condenser 112 goes to zero before this condenser recharges. This is shown after point $b$, Fig. 18, curve 138 representing the voltage at the common connection of resistances 110 and 122 (point B). As successive pulses are applied to the control electrode of device 107, the voltage shown in curve 137 progressively decreases, thereby increasing the negative reflector voltage at oscillator 1 and causing a frequency increase of that oscillator, an effect opposite to that required to cause conduction of device 107. At point $c$, Fig. 18, the conducting pulses applied to device 107 are stopped. At this time the voltage curve 137 decreases in magnitude until at point $d$ device 107 again is rendered conducting and stable operation renewed.

From the above description it is evident that oscillator 1 will swing in a direction tending to cause conduction of device 107 until conduction of that device takes place at a rate maintaining the negative voltage applied to the reflector electrode of oscillator 1 at an average voltage corresponding to the frequency necessary to produce that rate of conduction of device 107. Hence, the entire system can be stable only at that frequency and if any event tends to cause oscillator 1 to change in frequency, a corresponding change in the reflector voltage takes place, this change being in direction and magnitude to maintain the required conduction of device 107. For this reason the entire system adjusts itself to maintain substantially constant the frequency of oscillator 1.

In general, it is desirable to cause modulator 56 to operate at a relatively high frequency as compared to the frequency of oscillator 96. With the above-described constants this may, for example, be 800 cycles per second. In other words, the additional charge on condenser 121, taking place in the interval between two successive cycles of modulator 56, is made relatively small. This reduces the magnitude of scallops shown between time $a$ and time $b$, Fig. 18, to a negligible value so that the voltage applied to reflector electrode 4 of oscillator 1 is substantially constant except for the varying component due to operation of oscillator 56. In addition, it is desirable with the above-described circuit constants to arrange the circuit constants so that oscillator 1 operates at the desired frequency when device 107 conducts for about one out of every four cycles of modulator 56. Then the rate at which negative voltage applied to reflector 4 of oscillator 1 increases when device 107 conducts on each cycle is substantially equal to the rate at which this voltage decreases when device 107 is non-conducting.

The control circuit shown in Fig. 12 may, of course, be applied to control of quantities other than oscillator frequency. If, for example, it is desired to maintain constant voltage at a utilization device, voltage may be applied to that device from condenser 121 and circuits provided to actuate trigger 95 whenever the voltage at that device swings too far in the direction associated with discharge of condenser 121. Condenser 121 is recharged to a predetermined degree each time trigger 95 is actuated so that the system automatically maintains the voltage at the utilization device at a predetermined value, subject, of course, to the small variations associated with the charging cycles.

The control systems described herein depend only on the natural characteristics of resonant circuits as a means of determining oscillator frequency. At very high frequencies this is a substantial advantage for it is relatively easy to obtain a stable resonant circuit even at extremely high frequencies and the application of conventional frequency discriminators under such circumstances is very difficult. This is particularly true at microwave frequencies where ordinary circuit components such as inductors and capacitors cannot be used.

While I have illustrated and described particular embodiments of my invention, it will of course be understood that I do not intend to be limited thereto since various modifications both in the circuit arrangements and in the instrumentalities employed may be made, and I contemplate by the appended claim to cover any such modifications as fall within the true spirit and scope of my invention.

What I claim as new and desire to secure by Letters Patent of the United States is:

In a system for comparing two periodic voltages, a pair of electron discharge devices each having an anode, cathode and control electrode, a resistance-capacitance network connected between each of said cathodes and a point of reference potential, a first source of alternating reference voltage of substantially constant amplitude, means to impress voltage from said source between each of said anodes and said point in opposite phase, each of said networks having a relatively long time constant as compared to the period of said voltage, a second source of periodic voltage, means to impress voltage from said second source between each of said control electrodes and said reference point in the same phase, and an output circuit responsive to the peak voltage across said networks in series.

References Cited in the file of this patent

UNITED STATES PATENTS

| Number | Name | Date |
|---|---|---|
| 2,135,946 | Mountjoy | Nov. 8, 1938 |
| 2,183,399 | Heising | Dec. 12, 1939 |
| 2,217,477 | Gulliksen | Oct. 8, 1940 |
| 2,223,840 | Wolff | Dec. 3, 1940 |
| 2,233,778 | Foster | Mar. 4, 1941 |
| 2,245,685 | Koch | June 17, 1941 |
| 2,294,100 | Travis | Aug. 25, 1942 |
| 2,335,265 | Dodington | Nov. 30, 1943 |
| 2,369,663 | Dennis et al. | Feb. 20, 1945 |
| 2,404,568 | Dow | July 23, 1946 |
| 2,422,083 | Crosby | June 10, 1947 |
| 2,425,657 | Tunick | Aug. 12, 1947 |
| 2,462,857 | Ginzton et al. | Mar. 1, 1949 |
| 2,475,074 | Bradley | July 5, 1949 |